United States Patent [19]

Claessen

[11] Patent Number: 5,030,497
[45] Date of Patent: Jul. 9, 1991

[54] CARPET TILE AND METHOD OF PREPARING SAME

[75] Inventor: Johannes A. H. Claessen, Kleinhorst, Netherlands

[73] Assignee: Heuga Holding bv, Scherpenzeel, Netherlands

[21] Appl. No.: 413,832

[22] Filed: Sep. 28, 1989

[51] Int. Cl.⁵ .................. B32B 3/02; B32B 11/00; D03D 27/00; C09J 4/00
[52] U.S. Cl. .................... 428/95; 428/96; 428/97; 428/489; 156/182; 156/250; 156/324; 156/337
[58] Field of Search ................... 428/95, 198

[56] References Cited

U.S. PATENT DOCUMENTS

| | | | |
|---|---|---|---|
| 3,847,647 | 11/1974 | Bahlo | 428/198 |
| 4,576,665 | 3/1986 | Machell | 428/95 |
| 4,582,554 | 4/1986 | Bell et al. | |
| 4,678,694 | 7/1987 | Claessen | 428/95 |
| 4,702,950 | 11/1987 | Slosberg et al. | 428/95 |
| 4,737,221 | 4/1988 | Bell et al. | |
| 4,824,709 | 3/1989 | Tschirch | 428/95 |
| 4,913,952 | 4/1990 | Fowler | 428/95 |
| 4,915,999 | 4/1990 | Tillotson | 428/95 |

Primary Examiner—George F. Lesmes
Assistant Examiner—James D. Withers
Attorney, Agent, or Firm—Richard P. Crowley

[57] ABSTRACT

A carpet tile of improved dimensional stability having a hot melt composition backing layer and which has a secondary backing of a glass fiber tissue sheet material directly adjacent to a non-woven fibrous sheet material, such as a polypropylene sheet material. The backing layer penetrates the glass fiber tissue sheet material and partially penetrates and bonds the fibrous sheet material which forms the exterior surface of the secondary backing. The method of producing the carpet tile includes forcing the liquid, hot melt composition into the secondary backing sheet employing a roll-over-roll applicator.

29 Claims, 1 Drawing Sheet

CARPET TILE AND METHOD OF PREPARING SAME

BACKGROUND OF THE INVENTION

Carpet tiles having a fibrous face or wear surface and a solid backing layer composed of a hot melt composition, such as bitumen or atactic polypropylene, are well known and such carpet tiles and methods of producing such carpet tiles are described for example in U.S. Pat. No. 4,582,554, issued Apr. 15, 1986, as well as divisional U.S. Pat. No. 4,737,221, issued Apr. 12, 1988, which are hereby incorporated by reference in their entirety. These patents describe methods of producing carpet tiles with a hot melt bitumen composition backing layer by supporting a carrier, such as an endless belt or a secondary backing layer, applying a layer of a bitumen hot melt composition in liquid form to the carrier, laminating the back surface of a carpet material, which optionally may be precoated to the liquid hot melt composition on the carrier, cooling the carpet laminate and cutting the carpet laminate into carpet tile.

A laminate sheet material may be employed as the carrier belt rather than employing a separate, releasable, endless carrier belt, and also that the laminated material may become a direct part as a secondary backing of the carpet tile so produced. The backing sheet may be a laminate of glass and polythene film, that is, polyethylene film, with the film surface being applied directly to the carrier belt. Suitable laminate backing sheets disclosed include a laminate of glass and polyethylene film or glass-polyethylene-glass or a polyester fabric or paper-polyethylene film. In this method, it is essential that the expensive-type laminate backing sheets must be substantially resistant to the penetration therethrough of the hot melt, liquid composition. The backing sheet is useful in providing non-slip and dimensional stability characteristics to the resulting carpet tile.

In one method of producing carpet tile, a layer of a hot melt composition, such as a modified bitumen composition, is coated on an elongated, fibrous carrier sheet and the carrier sheet becomes a secondary backing sheet for the carpet tile. Normally, polypropylene or a blend of polypropylene and polyester non-woven fibers are employed as the secondary backing carrier sheet. However, the polypropylene sheet has a low melt and distortion temperature, for example at a temperature 20° C. to 30° C. below the application temperature of the hot melt composition, such as above temperatures of about 130° C. The hot melt composition is applied to the carrier sheet material or a carrier belt at a temperature sufficient to provide for a liquid, viscous, hot melt composition of defined thickness, e.g. 20 to 60 mils, such as at a temperature of generally 140° C. to 170° C., for example 150° C. to 160° C., which leads to the distortion of the polypropylene fibrous sheet. Therefore, polypropylene, non-woven sheet material is not a satisfactory material as a secondary backing carrier sheet.

There has been used as a secondary backing sheet a synthetic fiber backing carrier sheet, for example, composed of expensive, high temperature-resistant polyester sheet material, such as a spun-bonded, polyester, non-woven material known as Bidim TH 100 from Rhone Poulenc. Such backing material is employed for its high heat resistance and high stability, the use of which tends to prevent built-up tensions in the resulting carpet tile and therefore to improve dimensional properties of the product. However, such high temperature resistant synthetic fibers, such as the polyester fibers, are quite expensive.

It is desirable therefore to provide a carpet tile and a method of producing a carpet tile which provides a carpet tile of improved dimensional stability at a low cost and without the difficulties and disadvantages associated with the prior art use of carrier sheet secondary backing sheets.

SUMMARY OF THE INVENTION

The present invention relates to carpet tiles and to the method of producing the carpet tiles. More particularly, the invention concerns a carpet tile of improved dimensional stability having a secondary backing sheet and a method of producing a carpet tile of good dimensional stability and at low cost.

The carpet tile of the invention comprises a carpet material having a wear surface and an under surface and has a backing layer composed of a solid, hot melt composition and a secondary backing composed of adjacent layers of a porous, glass fiber sheet material, e.g. tissue, non-woven, glass fiber, and a porous, fibrous sheet material, with the fibrous sheet material as the exterior surface of the secondary backing layer and wherein the hot melt composition has penetrated and saturated the glass fiber material and partially penetrated the fibrous sheet material sufficient to bond the fibrous sheet material. Typically, the carpet tile comprises a fibrous carpet material wherein the secondary backing composition is a bitumen or a bitumen-modified hot melt composition. The secondary backing layer comprises separate adjacent layers of a porous, lightweight, glass fiber tissue sheet material and a lightweight, porous, non-woven, fibrous, e.g. polypropylene, sheet material and with the fibrous sheet material forming the exterior surface of the secondary backing layer and wherein the bitumen composition has penetrated only partially, e.g. 20% to 50%, the fibrous sheet material and the exterior surface is essentially free of the hot melt composition backing layer. It is not desirable for the hot melt composition of the backing layer to strike through the fibrous sheet material and penetrate through the exterior surface.

The method of producing the carpet tile comprises placing the glass fiber sheet material on top of the porous, fibrous sheet material with the adjacent layers of the glass fiber sheet material and the fibrous sheet material in one embodiment forming a carrier sheet for the hot melt composition. The method includes applying a hot liquid, hot melt composition as a layer to the top surface of the glass fiber sheet material. The viscous, hot melt composition is then forced, such as by the employment of a roll-over-roll technique, through the porous, glass fiber material and partially and slightly into the fibrous, non-woven sheet material so that the hot melt material composition provides a good bond between the hot melt composition forming the backing layer with the glass fiber and fibrous sheet material. As in normal carpet tile production, an additional layer or layers of a or the hot melt composition may be applied, with or without the employment of a glass fiber scrim or other sheet material placed within the backing layer. Thereafter, the carpet material is laminated to the hot melt composition at a laminating station, and thereafter, cooled in a controlled manner at a cooling station and cut at a cutting station into carpet tiles.

The carpet tile and method of the invention provide a significant advantage, both in the quality, i.e. the dimensional stability, and cost of the carpet tile and in the method of producing the carpet tile. The invention permits the use of much lower cost fibrous sheet material as a secondary backing layer, e.g. polyesters, and also a low temperature fibrous sheet material, e.g. polypropylene, in place of the much higher cost and higher temperature, flame resistant fibers, such as aramid fibers, in a secondary backing. The employment of a lightweight, non-woven, flexible, fibrous sheet material, like a non-woven polypropylene sheet material, in combination with the glass fiber tissue sheet material prevents the glass fibers from breaking when bent during handling and production, while the glass fiber tissue sheet material aids in shielding the lower cost, fibrous sheet material from the high temperature of the viscous, hot melt composition layer during application. The combination of the glass fiber tissue sheet material and a non-woven, fibrous sheet material like polypropylene further helps in lending a high mechanical stability to the resulting carpet tile and provides improved dimensional stability and reduces built-up tensions normally found in the production of the carpet tile. The carpet tile and method provide for significant cost savings, a more stable secondary backing for the carpet tile, easy processing with the use of the secondary backing and considerable flexibility in the choice of secondary backing materials.

The hot melt composition is applied to the secondary backing carrier sheet by a roll-over-roll applicator system to control the thickness of the backing layer. The use of heated doctor blades as an applicator is not desirable in that when the carrier sheet is over two meters in width, it is difficult to maintain a straight doctor blade with a loss of accuracy in backing thickness. When doctor blades are employed in the method, the carrier sheet is driven by the roller at the lamination station. The use of roll-over-roll application tends to force the hot melt composition through the lightweight sheets of the secondary backing sheet so that the viscosity of the hot melt composition must be raised or the temperature of the hot melt composition lowered to prevent total strike through. In addition, normally the roll-over-roll application increases the tension of the carrier sheet and leads to slight elongation of the carrier sheet. However, the use of the glass fiber tissue sheet material takes up the tension and since it is substantially non-stretchable unlike the fibrous secondary backing. The adjacent layer of the glass fiber tissue sheet material helps to shield the lower fibrous sheet material from the high temperature of the hot melt composition and to prevent shrinkage of the fibrous sheet material. For example, when a polypropylene, non-woven sheet material is used, the polypropylene fibers become soft, but are retained in a substantially non-shrink position by the adjacent, contacting, stable layer of the glass fiber tissue material.

The carpet material used for the carpet tile may comprise a carpet material having a wear surface, typically a fibrous wear surface, and an under surface, which under surface may or may not be precoated to enhance tuft lock of the fibers and/or to promote better adhesion with and bonding to the backing layer. Typically, the carpet material comprises a fibrous wear surface composed of natural or synthetic fibers, like nylon, or a mixture thereof, tufted or inserted into a primary backing sheet and presents a fibrous back surface as the under surface of the carpet material.

The hot melt composition suitable for use as a backing layer may comprise any hot melt material, such as a bitumen or a modified bitumen composition, but typically the hot melt compositions are liquid or viscous at temperatures over 140° C., such as from about 145° C. to 180° C. and have a viscosity of about 60,000 to 100,000 and up to 200,000 cps. The hot melt application temperatures would normally tend to distort low cost synthetic polyolefin fibers, such as polypropylene fibers, which tend to distort at temperatures of around 130° C. to 140° C. The fibrous sheet material alone without the use of the protective glass fiber tissue sheet material would be unsuitable for the purposes of the invention. The hot melt composition may be applied in one, or generally as two separate layers, and a sheet material to improve dimensional stability optionally may be employed between or in the layers, such as the use of a glass fiber scrim material.

Generally and preferably, the hot melt composition would comprise a bitumen-modified composition which would be liquid and applied in the range of about 145° C. to 160° C. The composition would comprise bitumen and a particulate filler material, for example, limestone or other filler particles or mixtures and a modifying agent, such as, for example, a thermoplastic block copolymer of styrene-butadiene-styrene in an amount sufficient to provide modifying and enhanced adhesive properties to the hot melt composition. While bitumen may be employed, it is desirable to use a modified bitumen hot melt composition containing a minor amount of a polymeric modifying agent to enhance the flexibility and the adhesive properties and reduce the viscosity of the hot melt composition, for example, 3 to 25 percent by weight, such as 5 to 20 percent. Suitable modifying polymers would include, but not be limited to: polybutadiene, ethylene vinyl acetates, EPDM and styrene-butadiene-styrene copolymers, particularly the branch chain, thermoplastic, SBS block copolymers. The modifying polymer may be used alone or in combination and optionally and preferably with the SBS copolymer be used with modifying oils to reduce the viscosity and to enhance the dispersion of the modifying polymer into the hot melt material. SBS block copolymers are normally used with modifying hydrocarbon oils, like napthenic oils, to promote dispersion into the bitumen (see for example U.S. Pat. No. 4,201,812 issued May 6, 1980 hereby incorporated by reference). The modifying oils may range from 30% to 80%, e.g. 55% to 70% by weight of the modifying polymers. The particulate filler materials are used to lower the price and to lower flame resistance and generally range from 30% to 80% by weight, e.g. 50% to 70% of the hot melt composition.

The glass fiber sheet material suitable for use in the secondary backing constitutes a porous glass fiber tissue sheet material, and preferably a lightweight, porous, non-woven, resin-bonded glass fiber tissue material. The tissue material should have enough porosity so that the viscous, hot melt composition may be forced therethrough at the hot melt application temperatures and sufficient fibrous body to protect the underlying synthetic fibrous sheet material. The glass fiber tissue material should be heat resistant, inexpensive and non-stretchable to reduce drive tension build up. Glass fiber scrim material with regular spaced, large, open pores is not suitable for use in the secondary backing sheet. Suitable glass fiber tissue sheet material would have a weight of about 25 to 80 g/m$^2$, e.g. 30 to 40 g/m$^2$, be resin-bonded, e.g. 10% to 25% weight of a resin, a fiber diameter of about 8 to 15 microns, e.g. 10 to 12 microns, a thickness of about 20 to 80 mils, e.g. 25 to 40 mils, and a porosity of about 2.0 to 8.0 (mm W.G.(c), e.g. 3.5 to 4.5. The porosity is measured as pressure drop for a known air flow of 2000 l/m²/second across the tissue.

The fibrous sheet material employed in combination with the glass fiber sheet material as a secondary backing comprises a porous, synthetic, fibrous sheet material composed for example of olefinic, e.g. polypropylene or polyester or other fibers which would tend to melt or be distorted in the presence of the temperature of the hot melt composition, such as about 140° C. or above. The non-woven or inexpensive polyester fibrous sheet material may comprise a lightweight, porous, non-woven, tissue type material having a thickness ranging from about 15 to 65 mils, e.g. 20 to 50 mils, and having a weight of about 20 g/m², for example, 30 to 100 g/m², e.g. 40 to 60 to 100 g/m². The non-woven, e.g. polypropylene, fibrous sheet may be resin-bonded, spun-bonded, embossed bonded or otherwise formed into a coherent sheet material. The polypropylene fiber may be used alone or admixed with other synthetic fibers, like polyester, or the polypropylene may be used over or with a core fiber material. A lightweight polyester sheet material may also be used as the secondary backing sheet material. Normally, lightweight fibrous sheet materials, like non-woven polyester, of less than 50 to 70 g/m² cannot be used as a secondary backing, since the hot melt composition would strike through to the exterior back surface, however, the use of a glass fiber tissue material helps prevent strike through and permits enough penetration to have effective bonding without strike through problems.

In one preferred embodiment, the secondary backing layers act as the carrier sheet to which the hot melt composition is applied as a backing layer. However, it is recognized that a separate carrier belt with a releasable type surface may be employed or that the hot melt composition may be applied directly to the surface of the carpet and the secondary backing applied directly to the hot melt composition. The secondary backing sheet is composed of the adjacent contacting layers of the glass fiber tissue and the tissue material. The glass fiber fibrous sheet and fibrous sheet material may be separately applied together during production. The glass fiber tissue material shields the polypropylene fibers from the high temperature of the viscous, hot melt composition, while the relatively thick polypropylene sheet material acts as a flexible carrier sheet and prevents the relatively thin glass fiber tissue material from breaking during the production and handling process. The combination provides good dimensional stability to the resulting carpet tile. The secondary backing is sufficiently porous so that during the application of the first hot melt composition backing layer, the hot melt composition may be easily forced by the roll-over-roll applicator to penetrate the glass fiber tissue and to penetrate the non-woven fibrous sheet so as to secure a good mechanical bond on cooling of the hot melt composition. Typically, the hot melt composition is visible through the back surface of the polypropylene sheet material but does not extend to the exterior surface. Generally, the total thickness gauge of the secondary backing of the glass fiber and the non-woven fibrous sheet would range from about 80 to 120 g/m², or 50 to 100 mils.

The invention will be described for the purposes of illustration only in connection with certain illustrated embodiments; however, it is recognized that various changes, modifications, additions and improvements may be made by those persons skilled in the art, all falling within the spirit and scope of the invention.

DESCRIPTION OF THE EMBODIMENTS

Figure 1:
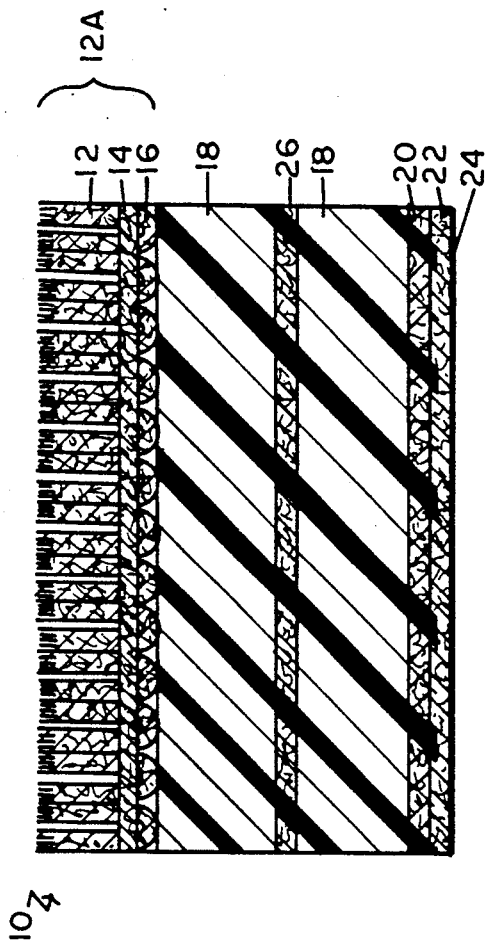
FIG. 1 is an illustrative, enlarged, sectional view of the carpet tile of the invention.

FIG. 1 shows a carpet tile 10 having a fibrous, tufted face 12, for example of nylon, tufted through a primary backing sheet 14, the tufts on the back surface 16 which compose the carpet material 12A. The carpet material 12A is secured to a modified bitumen composition backing layer 18 containing therein a glass fiber, tissue sheet material 26 between the separately applied backing layers. The modified bitumen composition comprises:

| Material | Parts by weight |
| --- | --- |
| Bitumen | 27.6 |
| SBS-block copolymer | 4.9 |
| Modifying napthenic oil | 2.5 |
| Limestone filler | 65.0 |
| | 100.0 |

The secondary backing comprises lightweight, glass fiber tissue sheet material 20 (33 g/m², resin-bonded, 30 mils and 3.8 porosity), and a spun-bonded polypropylene bonded by embossing, non-woven sheet material 22 (50 g/m², 30 mils). A layer of solid hot melt composition 18 penetrates and saturates the layer 20 and partially penetrates layer 22 to bond the layer 22, but the exterior back surface 24 of layer 22 is free of the hot melt composition.

Figure 2:
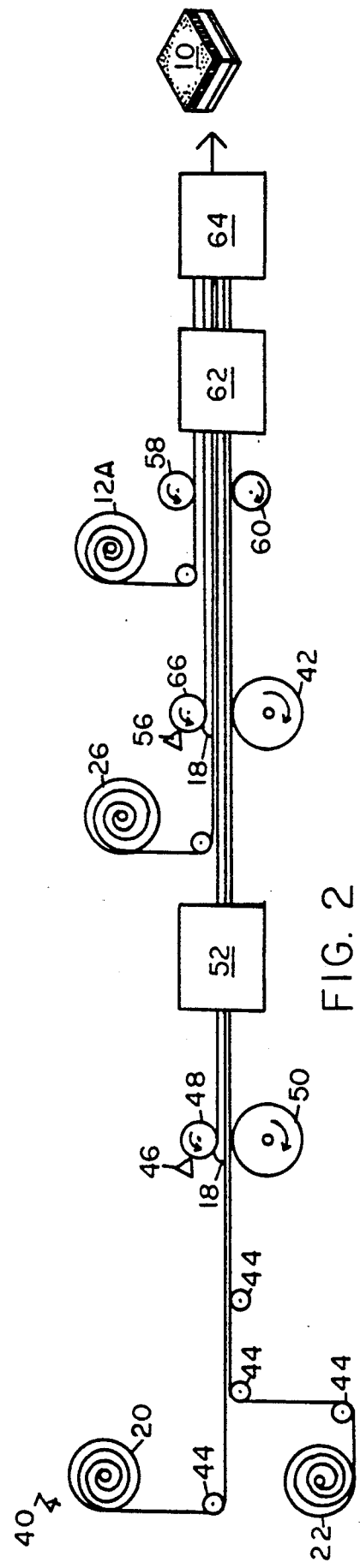
FIG. 2 is a schematic, illustrative view of a method of producing the carpet tile of the invention.

FIG. 2 is an illustration of a method 40 of producing the carpet tile 10 wherein the carpet material 12A is laid into a viscous, hot bitumen composition 18 and then laminated and the carpet passed through cooling 62 and cutting 64 zones. The method 40 uses a roll of glass fiber tissue 20 and a roll of non-woven polypropylene 22 fed through free-wheel rolls 44 with the combination of the sheets 20 and 22 forming a carrier sheet and as a secondary backing for the carpet tile 10. A first application layer of a viscous, liquid hot melt composition 18 at 145° C. to 155° C. and 60,000 to 80,000 cps is applied by a roll-over-roll applicator with a larger roller 50 and a smaller, roller 48 with a scraper blade 46 to remove the bitumen composition from the clockwise rotating surface of roller 48 so as to apply a controlled thickness of the modified bitumen hot melt composition to the top surface of the glass fiber tissue sheet material 20 and to force the viscous, hot melt composition 18 through the glass tissue sheet 20 and partially and slightly into the porous polypropylene sheet 22. Thereafter, the material is cooled in a controlled cooling zone 52, and optionally, but as illustrated, a layer of glass fiber tissue material 26 is placed on the top surface of the first backing layer. An additional backing layer of a hot melt composition 18 is applied over the tissue material 26 in another roll-over-roll application in the same or similar technique as in the first applicator employing heated rollers 42 and 66 with blade 56. The under surface of the carpet material 12A is then applied by laying the carpet material 12A onto the viscous top surface of the second layer and passed through opposing, driven laminating nip rolls 58–60 through a controlled cooling zone 62 to solidify the hot melt composition 18, and the resulting laminated carpet material cut into carpet tiles in a cutting zone 64 and the carpet material 10 recovered.

The carpet tile 10 provides for a carpet tile of improved dimensional stability and with a low cost, improved secondary backing sheet bonded to the backing layer.

What is claimed is:

1. A carpet tile which comprises:
    (a) a carpet material having an upper wear surface and a lower under surface;
    (b) a backing layer bonded to the lower under surface of the carpet material and which backing layer comprises a solid, hot melt composition having an application temperature of over about 140° C.;
    (c) a secondary backing layer bonded to the hot melt composition backing layer which comprises:
        (i) a layer of non-woven, porous, temperature-sensitive, fibrous sheet material which material tends to melt or distort at temperatures greater than about 140° C., the fibrous sheet material forming the exterior secondary backing surface of the carpet tile;
        (ii) an adjacent layer of a porous, non-woven, non-stretchable, heat resistant, glass fiber tissue sheet material, the tissue sheet material having sufficient fibrous body to protect the underlying temperature-sensitive sheet material from the hot melt composition on application and to prevent shrinkage of the fibrous sheet material and a porosity of 2.0 to 8.0 to permit the hot melt composition on application to be forced through the tissue sheet material at the hot melt application temperature, the glass fiber tissue sheet material saturated with and bonded to the hot melt composition backing layer, and the adjacent layer of the fibrous sheet material partially saturated with the hot melt composition and bonded thereto with the exterior backing surface of the fibrous sheet material essentially free of hot melt composition.

2. The carpet tile of claim 1 wherein the fibrous sheet material has a weight of about 20 to 100 g/m².

3. The carpet tile of claim 1 wherein the hot melt composition comprises bitumen or atactic polypropylene.

4. The carpet tile of claim 1 wherein the hot melt composition has an application temperature of about 145° C. to 180° C.

5. The carpet tile of claim 1 wherein the hot melt composition comprises a modified bitumen composition which comprises bitumen, limestone particulate filler material and a modifying amount of a thermoplastic block copolymer of styrene-butadiene-styrene.

6. The carpet tile of claim 1 wherein the glass fiber tissue sheet material comprises a non-woven, resin-bonded, glass fiber, porous tissue sheet material having a porosity of about 2.0 to 8.0.

7. The carpet tile of claim 1 wherein the non-woven, glass fiber tissue sheet material has a thickness of about 20 to 80 mils and a weight of 25 to 80 g/m².

8. The carpet tile of claim 1 which includes generally intermediate and within the hot melt composition backing layer a stabilizing layer of a glass fiber sheet material.

9. The carpet tile of claim 1 wherein the fibrous sheet material comprises a spun-bonded polypropylene fibrous sheet material.

10. The carpet tile of claim 9 wherein the polypropylene, non-woven, fibrous sheet material has a thickness of about 15 to 65 mils.

11. The carpet tile of claim 1 wherein the hot melt composition partially saturates the fibrous sheet material in an amount of about 20% to 50% of the fibrous sheet material.

12. The carpet tile of claim 2 wherein the fibrous sheet material comprises a non-woven polyester sheet material having a weight of about 40 to 60 g/m².

13. A carpet tile of improved dimensional stability, which carpet tile comprises:
    (a) a carpet material having an upper fibrous wear surface and a lower under surface;
    (b) a backing layer secured to the under surface of the carpet and comprising a solid, hot melt composition of bitumen, the composition having an application temperature of greater than about 140° C.; and
    (c) a secondary backing layer bonded to the back surface of the hot melt composition backing layer which comprises:
        (i) a layer of non-woven, porous, temperature-sensitive, fibrous sheet material as the exterior backing surface of the secondary backing layer, the fibrous sheet material having a melt temperature of about 140° C. to 150° C.;
        (ii) a layer of a porous, non-woven, non-stretchable glass fiber tissue sheet material having a porosity of about 3.5 to 4.5 and a weight of about 25 to 80 g/m² adjacent the layer of the non-woven, fibrous sheet material with a fibrous body sufficient to protect the temperature-sensitive, fibrous sheet material from the hot melt composition on application and to prevent shrinkage of the fibrous sheet material and sufficient porosity to permit the hot melt composition on application to be forced through the tissue sheet material at the hot melt application temperature;
        (iii) the hot composition saturating the glass fiber tissue sheet material and partially saturating the non-woven fibrous sheet material to a controlled thickness, the exterior backing surface of the fibrous sheet material essentially free of the hot melt composition.

14. A method of preparing a carpet tile from a carpet material having an upper wear surface and a lower under surface, which method comprises:
    (a) placing a layer of porous, non-stretchable, heat resistant, glass fiber tissue sheet material directly adjacent and on a layer of flexible, porous, non-woven, temperature-sensitive, fibrous sheet material to form a carrier sheet for the tissue sheet material, which fibrous sheet material tends to melt or distort at temperatures greater than about 140° C., the tissue sheet material having sufficient fibrous body to protect the underlying, temperature-sensitive sheet material from the hot melt composition on application and to prevent shrinkage of the fibrous sheet material and a porosity of 2.0 to 8.0 to permit the hot melt composition on application to be forced through the tissue sheet material at the hot melt application temperature;
    (b) applying to the surface of the glass fiber tissue sheet material a first backing layer of a viscous liquid, hot melt composition, the hot melt composition having an application temperature of over about 140° C.;

(c) forcing the viscous liquid, hot melt composition of the backing layer by a driven roll-over-roll applicator to penetrate the porous glass fiber tissue sheet material and partially to penetrate the fibrous sheet material, but not through to the exterior backing surface of the fibrous sheet material;

(d) contacting the hot melt composition of the first backing layer with the under surface of the carpet material;

(e) cooling the hot melt composition in contact with the under surface of the carpet material to form a solid hot melt composition backing layer bonded to the under surface of the carpet material; and (f) optionally cutting the cooled backing layer carpet material into carpet tiles.

15. The method of claim 14 wherein the viscous, hot melt composition has an application temperature of about 140° C. to 180° C.

16. The method of claim 14 which includes applying a second backing layer of hot melt composition over the first backing layer and applying a glass fiber sheet material to the surface of the first backing layer and prior to applying the second backing layer.

17. The method of claim 14 which includes precoating the under surface of the carpet material prior to contacting the under surface of the carpet material with the first or second backing layers.

18. The method of claim 14 wherein the hot melt composition comprises bitumen, limestone particulate filler material and a modifying amount of a thermoplastic block copolymer of styrene-butadiene-styrene.

19. The method of claim 14 wherein the glass fiber tissue sheet material comprises a resin-bonded tissue sheet material having a weight of about 25 to 80 g/m².

20. The method of claim 14 wherein the fibrous sheet material comprises a lightweight polyester or polypropylene sheet material having a weight of from about 30 to 60 g/m².

21. The method of claim 14 wherein the fibrous sheet material comprises a spun-bonded polypropylene sheet material having weight of about 20 to 100 g/m².

22. The method of claim 21 wherein the fibrous sheet material comprises a polypropylene sheet material and has a melt temperature of about 140° C. to 150° C. and which includes applying the hot melt composition at a temperature of about 145° C. to 160° C.

23. The method of claim 14 wherein the glass fiber tissue sheet material has a porosity of 2.0 to 8.0, and a thickness of about 20 to 80 mils.

24. The method of claim 14 wherein the fibrous sheet material has a thickness of about 15 to 65 mils.

25. The method of claim 14 wherein the viscous liquid hot melt composition has a viscosity of about 60,000 to 100,000 cps, and the glass fiber tissue sheet material has a porosity of about 2.0 to 8.0.

26. The method of claim 14 which includes a driven roll-over-roll applicator wherein the upper roll has a smaller diameter than the lower roll, and which lower roll is in contact with the temperature-sensitive fibrous sheet material.

27. The method of claim 14 which includes retaining the fibers of the temperature-sensitive fibrous sheet material in a substantially non-shrink position when the fibers become soft on the application of the hot melt composition by the contacting adjacent glass fiber tissue sheet material.

28. The carpet tile produced by the method of claim 21.

29. The carpet tile produced by the method of claim 14.

* * * * *